US012002194B2

(12) United States Patent
Machek et al.

(10) Patent No.: US 12,002,194 B2
(45) Date of Patent: Jun. 4, 2024

(54) TRAINING AN ARTIFICIAL NEURAL NETWORK USING SIMULATED SPECIMEN IMAGES

(71) Applicant: FEI Company, Hillsboro, OR (US)

(72) Inventors: Ondřej Machek, Brno (CZ); Tomáš Vystavěl, Brno (CZ); Libor Strakoš, Eindhoven (NL); Pavel Potocek, Eindhoven (NL)

(73) Assignee: FEI Company, Hillsboro, OR (US)

( * ) Notice: Subject to any disclaimer, the term of this patent is extended or adjusted under 35 U.S.C. 154(b) by 343 days.

(21) Appl. No.: 17/072,035

(22) Filed: Oct. 16, 2020

(65) Prior Publication Data

US 2021/0049749 A1 Feb. 18, 2021

Related U.S. Application Data

(63) Continuation of application No. 16/045,702, filed on Jul. 25, 2018, now Pat. No. 10,846,845.

(51) Int. Cl.
*G06T 7/00* (2017.01)
*G06F 18/214* (2023.01)
*G06N 3/08* (2023.01)
*G06V 10/774* (2022.01)
*G06V 10/82* (2022.01)

(52) U.S. Cl.
CPC ............ *G06T 7/001* (2013.01); *G06F 18/214* (2023.01); *G06N 3/08* (2013.01); *G06V 10/774* (2022.01); *G06V 10/82* (2022.01); *G06T 2207/10056* (2013.01); *G06T 2207/20081* (2013.01);

(Continued)

(58) Field of Classification Search
CPC . G06T 2207/10056; G06T 2207/20081; G06T 2207/20084; G06T 2207/10061; G06T 7/0004; G06T 7/001
See application file for complete search history.

(56) References Cited

U.S. PATENT DOCUMENTS 10,186,026 B2   1/2019  Karsenti et al.
2004/0092042 A1* 5/2004  Higgs ............... G01N 21/6489
                                                          438/16

(Continued)

FOREIGN PATENT DOCUMENTS

CN   106568783 A   4/2017
CN   108291878 A   7/2018

OTHER PUBLICATIONS

EMsoft: General User and Development Manual (Submitted on IDS) (Year: 2017).*

(Continued)

*Primary Examiner* — Ross Varndell
(74) *Attorney, Agent, or Firm* — Klarquist Sparkman, LLP

(57) ABSTRACT

Techniques for training an artificial neural network (ANN) using simulated specimen images are described. Simulated specimen images are generated based on data models. The data models describe characteristics of a crystalline material and characteristics of one or more defect types. The data models do not include any image data. Simulated specimen images are input as training data into a training algorithm to generate an artificial neural network (ANN) for identifying defects in crystalline materials. After the ANN is trained, the ANN analyzes captured specimen images to identify defects shown therein.

18 Claims, 7 Drawing Sheets

(52) U.S. Cl.
CPC .............. *G06T 2207/20084* (2013.01); *G06T 2207/30148* (2013.01)

(56) References Cited

U.S. PATENT DOCUMENTS

| | | | |
|---|---|---|---|
| 2008/0230779 | A1 | 9/2008 | Goyal |
| 2017/0148226 | A1 | 5/2017 | Zhang et al. |
| 2017/0177997 | A1 | 6/2017 | Karlinsky et al. |
| 2017/0345140 | A1 | 11/2017 | Zhang et al. |
| 2017/0351952 | A1 | 12/2017 | Zhang et al. |
| 2019/0073568 | A1 | 3/2019 | He et al. |
| 2019/0257767 | A1 | 8/2019 | Shaubi et al. |
| 2019/0303717 | A1* | 10/2019 | Bhaskar .............. G06V 30/2504 |
| 2019/0333208 | A1* | 10/2019 | Asbag ................. G06V 10/764 |
| 2020/0025696 | A1 | 1/2020 | Potocek |

OTHER PUBLICATIONS

An Introduction to Electron Microscopy—Focused Ion Beam Systems and DualBeam™ Systems, Thermo Fisher Scientific, 2018, 2 pages.
An Introduction to Electron Microscopy—Practical Applications of Electron- and Ion-Beam Microscopy, Thermo Fisher Scientific, 2018, 3 pages.
An Introduction to Electron Microscopy—The Scanning Electron Microscope, Thermo Fisher Scientific, 2018, 2 pages.
An Introduction to Electron Microscopy—The Scanning Transmission Electron Microscope, Thermo Fisher Scientific, 2018, 2 pages.
An Introduction to Electron Microscopy—Types of Microscopes, Thermo Fisher Scientific, 2018, 2 pages.
EMsoft: General User and Development Manual, Program Manual, Release 3.1, Mar. 25, 2017, 12 pages.
Graef, New Release of EMsoft Package, 2 pages, http://muri.materials.cmu.edu/?author=2.
How Electron and Ion beam microscopes work—An Introduction to Electron Microscopy, Thermo Fisher Scientific, 2018, 2 pages.
Introduction to Electron Microscopy—History, Thermo Fisher Scientific, 2018, 3 pages.
Liu, R., Freund, Y., and Spraggon, G., "Image-based crystal detection: a machine-learning approach," *Acta Crystallographica Section D Biological Crystallography*, vol. 64, pp. 1187-1195 (2008).
Office action (and English-language translation), dated Apr. 9, 2024, issued in CN App. No. 201910612693.2.

* cited by examiner

Defective Crystalline Data Model
112

Target Layer Characteristics
116

Substrate Layer Characteristics
118

Defect Type Characteristics
120

Defect Position Characteristics
122

Microscope Characteristics
124

Noise Characteristics
126

Fig. 1B

TRAINING AN ARTIFICIAL NEURAL NETWORK USING SIMULATED SPECIMEN IMAGES

INCORPORATION BY REFERENCE; DISCLAIMER

The following application is hereby incorporated by reference: application Ser. No. 16/045,702 filed on Jul. 25, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to artificial neural networks for specimen image analysis. In particular, the present disclosure relates to training an artificial neural network using simulated specimen images.

BACKGROUND

Microscopy is the technical field of using microscopes to better view objects that are difficult to see with the naked eye. Different branches of microscopy include, for example: optical microscopy, charged particle (electron and/or ion) microscopy, and scanning probe microscopy.

Charged particle microscopy involves using a beam of accelerated charged particles as a source of illumination. Types of electron microscopy include, for example: transmission electron microscopy, scanning electron microscopy, scanning transmission electron microscopy, and focused ion beam microscopy.

Components of a transmission electron microscope (TEM) include: an electron optical column, a vacuum system, the necessary electronics (lens supplies for focusing and deflecting the beam and the high voltage generator for the electron source), and control software. An electron optical column includes an electron gun on one end and a viewing device (such as a camera) on the other end. An electron beam emerges from the electron gun, and passes through a thin specimen, transmitting electrons which are collected, focused, and projected onto the viewing device. The entire electron path from gun to camera is under vacuum.

Similar to a TEM, components of a scanning electron microscope (SEM) include: an electron optical column, a vacuum system, the necessary electronics (lens supplies for focusing and deflecting the beam and the high voltage generator for the electron source), and control software. An electron gun is positioned on one end of the electron optical column. A specimen is positioned on the other end of the electron column. An electron beam from the electron gun is focused into a fine spot on the specimen surface. The electron beam is scanned in a rectangular raster over the specimen. The intensities of various signals created by interactions between the beam electrons and the specimen are measured and stored in computer memory. The stored values are then mapped as variations in brightness on the image display.

A scanning transmission electron microscope (STEM) is similar to a TEM in that images are formed by electrons passing through a sufficiently thin specimen. However, rather than capturing the image all at once, a STEM focuses the electron beam on a fine spot, which is then scanned over the sample in a raster illumination system.

A focused ion beam microscope (FIB microscope) is similar to a SEM, however a FIB microscope uses a beam of ions instead of a beam of electrons. Examples of ion beam sources include liquid metal ion sources (LMIS), such as gallium ion sources.

A microscope is associated with a variety of configurable microscopy parameters. Examples of microscopy parameters of a SEM include: an accelerating voltage (a voltage at which electrons are being accelerated as the electrons travel through an electron optical column); a convergence angle of the electron beam; a beam current; a spot size (a diameter of the beam spot on the specimen); a dwell time; a resolution; a backscattered electron (BSE) detector collection angle; and a collection efficiency. Different values for the various microscopy parameters result in images of different qualities and attributes. For example, higher magnification requires a smaller spot size. Higher signal-to-noise ratio and contrast resolution requires greater beam current. However, reducing the spot size also decreases the beam current.

A specimen is an object (or a part of an object) to be studied and/or analyzed using a microscope. In the field of semiconductors, examples of specimens include crystalline materials, and semiconductor materials. A crystalline material includes a target layer and a substrate layer. The target layer may be deposited or grown on the substrate layer via epitaxy. An example of a crystalline material includes Silicon-Germanium (SiGe) as a target layer and Silicon (Si) as a substrate layer. A common problem with such crystalline materials is the generation of structural defects such as dislocations and stacking faults. A microscope may be used to observe any defects within a crystalline material. One type of method for capturing an image of a crystalline material is electron channeling contrast imaging (ECCI).

An artificial neural network (ANN) may be used to identify defects within a crystalline material as shown in a specimen image. An ANN is a type of machine learning or artificial intelligence system. An ANN is trained on a set of training data, which includes specimen images showing crystalline materials that include defects. Each specimen image is labeled with information associated with the defects, such as the number of defects in the specimen image, the defect types of the defects in the specimen image, and/or the positions of the defects in the specimen image. A larger set of training data typically improves the accuracy of the ANN. However, generating the training data may involve time-consuming processes. First, crystalline material including defects need to be produced. However, some types of defects are rare and/or difficult to produce. Second, a microscope is used to capture specimen images of the crystalline materials. Third, the captured specimen images are labeled with information associated with the defects.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one"

embodiment in this disclosure are not necessarily to the same embodiment, and they mean at least one. In the drawings:

FIG. 1B illustrates an example defective crystalline data model, in accordance with one or more embodiments;

DETAILED DESCRIPTION

Figure 1A:
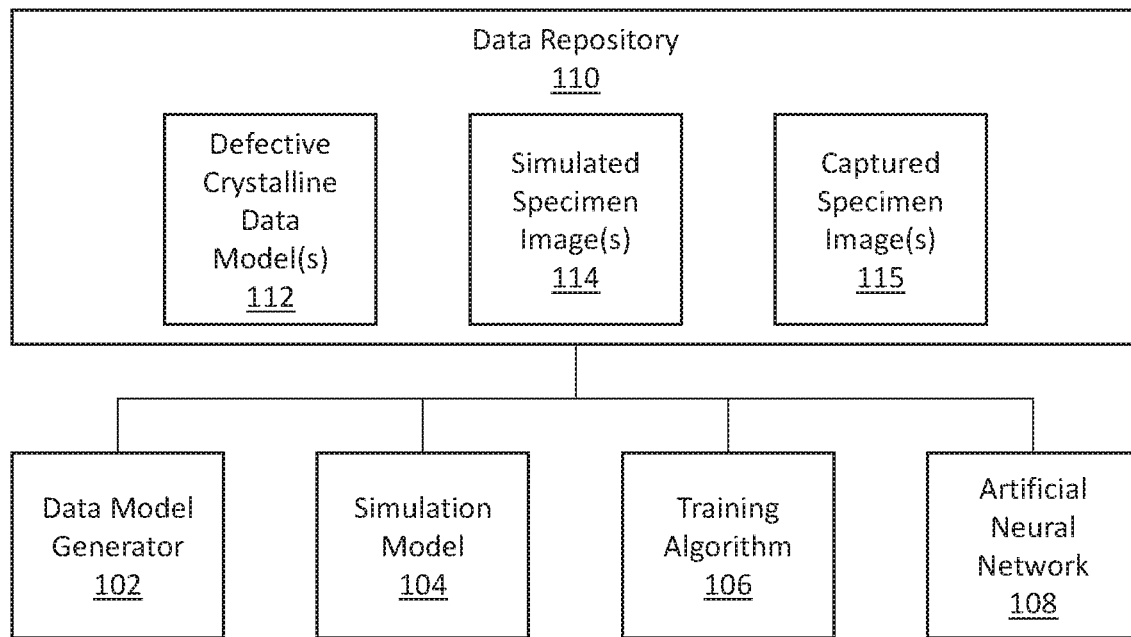
FIG. 1A illustrates an example artificial neural network training system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARTIFICIAL NEURAL NETWORK TRAINING SYSTEM ARCHITECTURE
3. TRAINING AN ARTIFICIAL NEURAL NETWORK USING SIMULATED SPECIMEN IMAGES
4. EXAMPLE EMBODIMENT
5. HARDWARE OVERVIEW
6. MISCELLANEOUS; EXTENSIONS

1. General Overview

One or more embodiments include training an artificial neural network (ANN) to identify defects in crystalline materials as shown in specimen images. Captured specimen images are generated based on a view of a specimen using a microscope. In contrast, simulated specimen images are generated based on data models. The data models describe characteristics of a crystalline material and characteristics of one or more defect types. The data models do not include any image data. Simulated specimen images are input as training data into a training algorithm to generate an artificial neural network (ANN) for identifying defects in crystalline materials. After the ANN is trained, the ANN analyzes captured specimen images to identify defects shown therein.

One or more embodiments include selectively generating simulated specimen images to generate a modified ANN. An ANN, trained based on simulated specimen images, analyzes captured specimen images to identify defects shown therein. Defect identification rates, for various defect types, achieved by the ANN are determined. Additional simulated specimen images including defect types associated with lower defect identification rates are generated. Additional simulated specimen images including defect types associated with higher defect identification rates are not generated. The additional simulated specimen images are input as training data into a training algorithm to generate a modified ANN. In other embodiments, both simulated specimen images associated with lower defect identification rates and simulated specimen images associated with higher defect identification rates are generated and input as training data into a training algorithm to generate a modified ANN.

By using simulated specimen images, a large set of training data for an ANN may be efficiently generated. Using captured specimen images as training data requires first producing crystalline materials including defects. However, some types of defects are rare and/or difficult to produce. In contrast, simulated specimen images showing defects of a large variety of defect types may be generated based on data models describing the different defect types. Further, the types of defects that are shown in the simulated specimen images may be specifically tailored, such that the training of the ANN may be focused on specific defect types.

One or more embodiments described in this Specification and/or recited in the claims may not be included in this General Overview section.

2. Artificial Neural Network Training System Architecture

FIG. 1A illustrates an example artificial neural network (ANN) training system, in accordance with one or more embodiments. As illustrated in FIG. 1A, a system 100 includes a data model generator 102, a simulation model 104, a training algorithm 106, an ANN 108, and a data repository 110. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, a data repository 110 is any type of storage unit and/or device (e.g., a file system, database, collection of tables, or any other storage mechanism) for storing data. Further, a data repository 110 may include multiple different storage units and/or devices. The multiple different storage units and/or devices may or may not be of the same type or located at the same physical site. Further, a data repository 110 may be implemented or may execute on the same computing system as a data model generator 102, simulation model 104, training algorithm 106, and/or ANN 108. Alternatively or additionally, a data repository 110 may be implemented or executed on a computing system separate from a data model generator 102, simulation model 104, training algorithm 106, and/or ANN 108. The data repository 110 may be communicatively coupled to the data model generator 102, simulation model 104, training algorithm 106, and/or ANN 108 via a direct connection or via a network.

Information describing one or more defective crystalline data models 112, one or more simulated specimen images 114, and one or more captured specimen images 115, may be implemented across any of components within a system 100. However, this information is illustrated within a data repository 110 for purposes of clarity and explanation.

In one or more embodiments, a defective crystalline data model 112 is a description of a crystalline material including one or more defects. A defective crystalline data model 112 may include data that is represented in textual and/or numerical format. A defective crystalline data model 112 may include information organized as name-value pairs. A defective crystalline data model 112 may be stored as one or more data files. The data files may be stored in, for example, JSON (JavaScript Object Notation) format, and/or HDF5 (Hierarchical Data Format) format.

A defective crystalline data model 112 does not include any image data, or data that is represented in an image format. Image data is data that can be rasterized as a grid of pixels. Image data formats include raster, vector, uncompressed, compressed formats. Examples of raster formats include JPEG (Joint Photographic Experts Group), EXIF (Exchangeable Image File Format), TIFF (Tagged Image File Format), GIF (Graphics Interchange Format), BMP, and PNG (Portable Network Graphics). Examples of vector formats include CGM (Computer Graphics Metafile), Gerber, and SVG (Scalable Vector Graphics).

FIG. 1B illustrates an example defective crystalline data model. Components labeled with the same numerals across FIGS. 1A-1C refer to similar components. As illustrated, a defective crystalline data model 112 includes one or more target layer characteristics 116, one or more substrate layer characteristics 118, one or more defect type characteristics 120, one or more defect position characteristics 122, one or more microscope characteristics 124, and one or more noise characteristics 126.

In one or more embodiments, a target layer characteristic 116 is a characteristic of a target layer of a crystalline material. A target layer exhibits a periodic crystal structure. The positions of atoms or molecules occur on repeating fixed distances, determined by unit cell parameters. An example of a target layer is Silicon-Germanium (SiGe).

Target layer characteristics 116 may be expressed using textual and/or numerical data. Target layer characteristics 116 does not include any image data. Target layer characteristics 116 may include, for example, the following pieces of information associated with the target layer:
- (a) a crystal system (such as, cubic, tetragonal, hexagonal, orthorhombic, rhombohedral, monoclinic, or anorthic);
- (b) lattice parameters (such as a Bravais lattice);
- (c) a space group number;
- (d) atom coordinates;
- (e) site occupation parameters; and
- (f) Debye-Waller factors.

In one or more embodiments, a substrate layer characteristic 118 is a characteristic of a substrate layer of a crystalline material. A substrate layer exhibits a periodic crystal structure. The positions of atoms or molecules occur on repeating fixed distances, determined by unit cell parameters. An example of a substrate layer is Silicon (Si).

Substrate layer characteristics 118 may be expressed using textual and/or numerical data. Substrate layer characteristics 118 does not include any image data. Substrate layer characteristics 118 may include, for example, the following pieces of information associated with the substrate layer:
- (a) a crystal system (such as, cubic, tetragonal, hexagonal, orthorhombic, rhombohedral, monoclinic, or anorthic);
- (b) lattice parameters (such as a Bravais lattice);
- (c) a space group number;
- (d) atom coordinates;
- (e) site occupation parameters; and
- (f) Debye-Waller factors.

In one or more embodiments, a defect type characteristic 120 is a characteristic of a structural defect within a crystalline material. A defect disrupts the repeating pattern of atoms or molecules in the target layer and/or the substrate layer. Defects may occur as, for example, point defects, line defects, and/or planar defects. As an example, a Burgers vector may represent a magnitude and direction of a lattice distortion resulting from a dislocation in a crystalline material.

In one or more embodiments, a defect position characteristic 122 is a description of a position of a defect within a crystalline material. A defect position may be described with respect to the edges (or another position) of a specimen image of the crystalline material. A defect position may be expressed as x-y coordinates with respect to the edges (or another position) of a specimen image of the crystalline material. One or more defect positions may be specified, indicating the respective positions of one or more defects within the crystalline material.

In one or more embodiments, a microscope characteristic 124 is a characteristic of a microscope that is simulated to produce a specimen image of the crystalline material.

A microscope characteristic 124 may indicate a type of microscope that is being used. Examples of microscope types include an electron microscope, an ion microscope, a SEM, a TEM, and a STEM.

Additionally or alternatively, a microscope characteristic 124 may indicate a microscopy parameter configured for the microscope. Examples of microscopy parameters of a SEM include: an accelerating voltage (a voltage at which electrons are being accelerated as the electrons travel through an electron optical column); a convergence angle of the electron beam; a beam current; a spot size (a diameter of the beam spot on the specimen); a dwell time; a resolution; a backscattered electron (BSE) detector collection angle; and a collection efficiency. Additional and/or alternative microscopy parameters may be used for other types of microscopes. Different values for the various microscopy parameters result in images of different qualities and attributes. For example, higher magnification requires a smaller spot size. Higher signal-to-noise ratio and contrast resolution requires greater beam current. However, reducing the spot size also decreases the beam current.

In one or more embodiments, a noise characteristic 126 is a characteristic of noise that is simulated in a specimen image. Noise may be due to, for example, disturbances of the microscope used for capturing the specimen image, dust or other impurities on the microscope and/or the specimen, and/or other unknown noise sources.

Referring back to FIG. 1A, in one or more embodiments, a captured specimen image 115 is an image of a specimen that is generated based on a view of the specimen using a microscope. In contrast, a simulated specimen image 114 is an image of a specimen that is simulated based on a defective crystalline data model 112. A simulated specimen image 114 of a specimen is generated without viewing the specimen using a microscope. The specimen may or may not exist. The specimen may even include a material that cannot be produced using current manufacturing methods.

In one or more embodiments, a data model generator 102 refers to hardware and/or software configured to generate defective crystalline data models 112. A data model generator 102 may generate multiple defective crystalline data models that are associated with the same crystalline material and defect types, but are associated with different microscope characteristics and/or noise characteristics. Additionally or alternatively, a data model generator 102 may modify a particular defective crystalline data model associated with a particular crystalline material and a particular defect type. The data model generator 102 may modify the microscope characteristics and/or noise characteristics of the particular defective crystalline data model to generate multiple defective crystalline data models. Examples of operations for generating defective crystalline data models 112 are described below with reference to FIGS. 2A-B.

In one or more embodiments, a simulation model 104 refers to hardware and/or software configured to generate simulated specimen images 114 using defective crystalline data models 112. A simulation model 104 includes an image capturing simulator and, optionally, a merger module.

An image capturing simulator accepts a defective crystalline data model as an input. The image capturing simulator generates a raw simulated specimen image as an output. An example of an image capturing simulator is EMsoft. EMSOFT: GENERAL USER AND DEVELOPMENT MANUAL (Program Manual, Release 3.1), Mar. 25, 2017, is hereby submitted in Appendix A and incorporated by reference.

A merger module merges a raw simulated specimen image and a captured specimen image to produce a final simulated specimen image. As an example, portions of a raw simulated specimen image including a simulated defect may be identified. Portions of a captured specimen image including noise that was actually captured may be identified. The identified portions of the raw simulated specimen image and the identified portions of the captured specimen image may be merged to produce a final simulated specimen image.

In one or more embodiments, a training algorithm 106 refers to hardware and/or software configured to train an ANN 108. Training an ANN 108 includes adjusting weights associated with connections between artificial neurons within the ANN 108. A training algorithm 106 may include backpropagation, support vector machine (SVM), pattern recognition, Bayesian statistics, and/or other supervised or unsupervised learning methods.

A training algorithm 106 accepts training data as input. Training data includes sample data to be analyzed by an ANN 108. The sample data is labeled with the output that is desired from the ANN 108. As an example, training data may be specimen images showing crystalline materials including defects. Each specimen image may be labeled with the defect types corresponding to the defect shown in the specimen image. The training data may be input to a training algorithm to generate an ANN that identifies defects in crystalline materials as shown in specimen images.

A training algorithm 106 may be applied to successive sets of training data to generate modified and/or improved ANNs 108. A training algorithm 106 may be initially applied to a small set of training data to generate an initial ANN 108. Subsequently, additional training data may be collected and/or obtained. The training algorithm 106 may be applied to a larger set of training data (including the additional training data). The training algorithm 106 hence generates a modified and/or improved ANN 108.

Examples of operations for training an ANN using simulated specimen images 114 are described below with reference to FIGS. 2A-B.

In one or more embodiments, an ANN 108 (also referred to as a deep learning system) is a machine-learning computing system. An ANN 108 includes a collection of connected units or nodes, which are called artificial neurons. Each connection transmits a signal from one artificial neuron to another. An artificial neuron that processes a received signal to transmit another signal to another artificial neuron. Artificial neurons may be aggregated into layers. Different layers may perform different kinds of transformations on their inputs.

One type of ANN is a convolutional neural network. Convolutional neural networks are designed to process data that come in the form of multiple arrays, such as a color image composed of three two-dimensional arrays containing pixel intensities in three color channels. An example architecture of a conventional neural network is structured as a series of stages. The first few stages are composed of two types of layers: convolutional layers and pooling layers. A convolutional layer applies a convolution operation to the input, passing the result to the next layer. The convolution emulates the response of an individual neuron to visual stimuli. A pooling layer combines the outputs of neuron clusters at one layer into a single neuron in the next layer. For example, max pooling uses the maximum value from each of a cluster of neurons at the prior layer.

In one or more embodiments, an ANN 108 is configured to identify a defect within a crystalline material as shown in a specimen image. Identifying a defect within a crystalline material includes classifying the defect as a particular defect type.

In one or more embodiments, a data model generator 102, simulation model 104, training algorithm 106, and/or ANN 108 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a printer, a mobile handset, a smartphone, and/or a personal digital assistant (PDA).

Figure 1C:
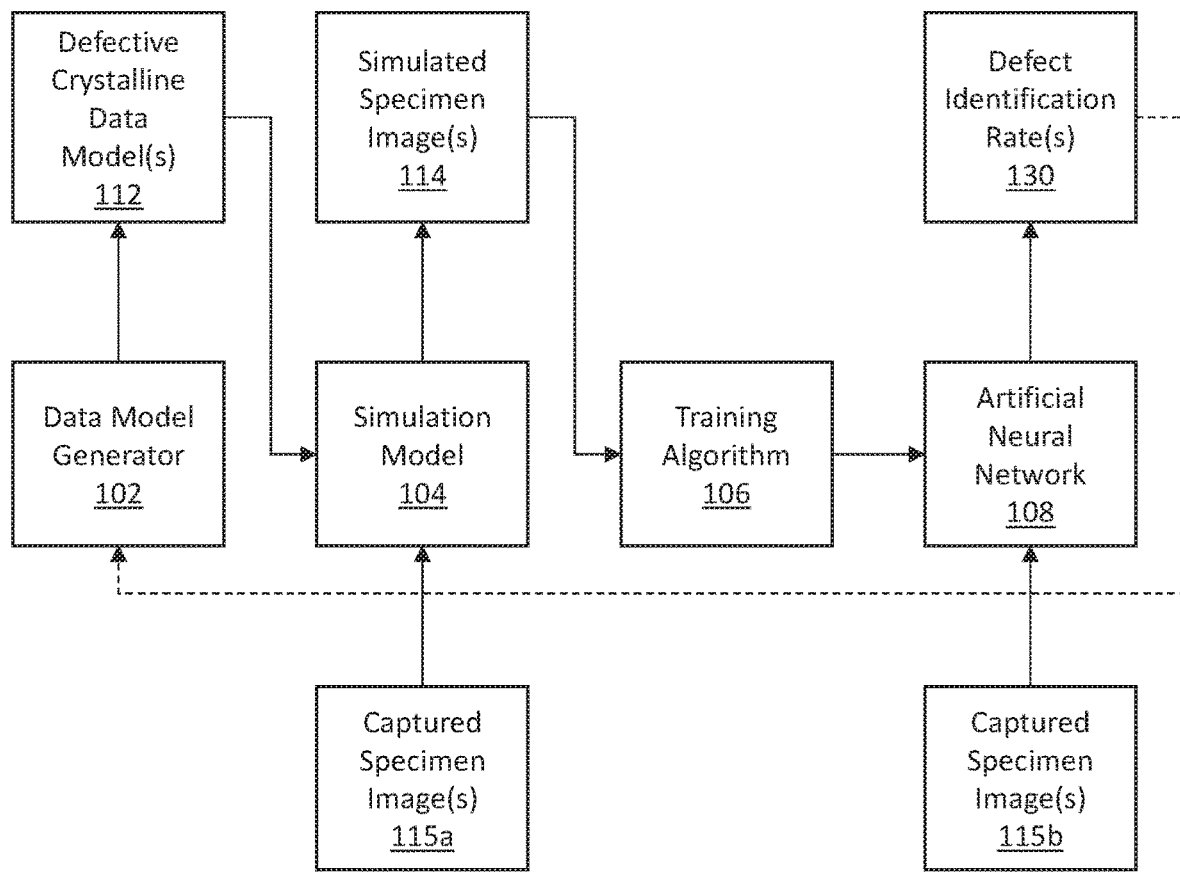
FIG. 1C illustrates an example process flow for training an artificial neural network using simulated specimen images, in accordance with one or more embodiments.

FIG. 1C illustrates an example process flow for training an ANN using simulated specimen images, in accordance with one or more embodiments. Components labeled with the same numerals across FIGS. 1A-1C refer to similar components.

As illustrated, a data model generator 102 generates one or more defective crystalline data models 112. A particular defective crystalline data model 112 may be generated based on a user's specification of the crystalline material and/or defect types. Additional defective crystalline data models 112 may be generated by modifying the particular defective crystalline data model 112. The additional defective crystalline data models 112 may be associated with the same crystalline material and/or defect types as the particular defective crystalline data model 112, but may be associated with different microscope characteristics and/or noise characteristics.

The defective crystalline data models 112 are input into a simulation model 104. An image capturing simulator, within the simulation model 104, generates raw simulated specimen images based on the defective crystalline data models 112. Optionally, a merger module, within the simulation model 104, merges portions of raw simulated specimen images and portions of captured specimen images 115a. As an example, a merger module merges (a) a portion of a raw simulated specimen image showing a simulated defect, and (b) a portion of a scanned specimen image showing a speck of dust on the specimen. As used herein, a "simulated specimen image" may refer to either (a) a raw simulated specimen image generated by an image capturing simulator, or (b) a final simulated specimen image merged from the raw simulated specimen image and a captured specimen image (if a merger module is used). Hence, the simulation model 104 generates simulated specimen images 114.

The simulated specimen images 114 are input as training data into a training algorithm 106. Each simulated specimen image 114, within the training data, is labeled with the defect type of the defect shown in the simulated specimen image 114. Based on the training data, the training algorithm 106 generates an ANN 108. As an example, the training algorithm 106 determines weights associated with connections between artificial neurons of the ANN 108.

The ANN 108 is applied to one or more captured specimen images 115b. Note that both captured specimen images 115a and captured specimen images 115b refer to the captured specimen images 115 described above with reference to FIG. 1A. However, captured specimen images 115a may be specimen images that include noise characteristics and/or other characteristics a user would like to incorporate into the training data for the ANN 108. In contrast, captured specimen images 115b may be specimen images that include real defects that a user would like to identify and/or analyze. Captured specimen images 115a and captured specimen images 115b may or may not be the same.

The captured specimen images 115b show defects of one or more defect types. The ANN 108 identifies defects in the crystalline material as shown in the captured specimen images 115b. The ANN 108 determines a defect type of each defect in the crystalline material. A user may review the captured specimen images 115b to determine whether the ANN's identification of defects is accurate. For each defect type, a defect identification rate is determined. A defect identification rate indicates the accuracy with which the ANN identifies defects of a particular defect type.

Optionally, a set of defect identification rates 130, corresponding to the various defect types, are input into the data model generator 102. The data model generator 102 identifies which of the set of defect identification rates 130 do not satisfy a particular criteria. As an example, defect identification rates that are below a threshold value do not satisfy a particular criteria. Additionally or alternatively, the lowest defect identification rates, of the set of defect identification rates, do not satisfy a particular criteria. The data model generator 102 identifies the defect types corresponding to the non-satisfactory defect identification rates. The identified defect types are the defect types for which the ANN 108 performs poorly. The data model generator 102 generates additional defective crystalline data models 112 associated with the identified defect types. The data model generator 102 refrains from generating additional defective crystalline data models 112 associated with non-identified defect types.

The additional defective crystalline data models 112 are input into the simulation model 104. The simulation model 104 generates additional simulated specimen images 114. The additional simulated specimen images 114 show defects of the defect types for which the ANN 108 performs poorly. The additional simulated specimen images 114 do not show defects of other defect types.

The additional simulated specimen images 114 are input as training data into the training algorithm 106. Based on the additional simulated specimen images 114, the training algorithm 106 generates a modified ANN 108.

Hence, an ANN 108 is trained based on simulated specimen images 114. Moreover, a performance of the ANN 108 is fed back into the ANN training system to selectively generate additional simulated specimen images associated with defect types for which the ANN 108 performs poorly.

3. Training an Artificial Neural Network Using Simulated Specimen Images

Figure 2A:
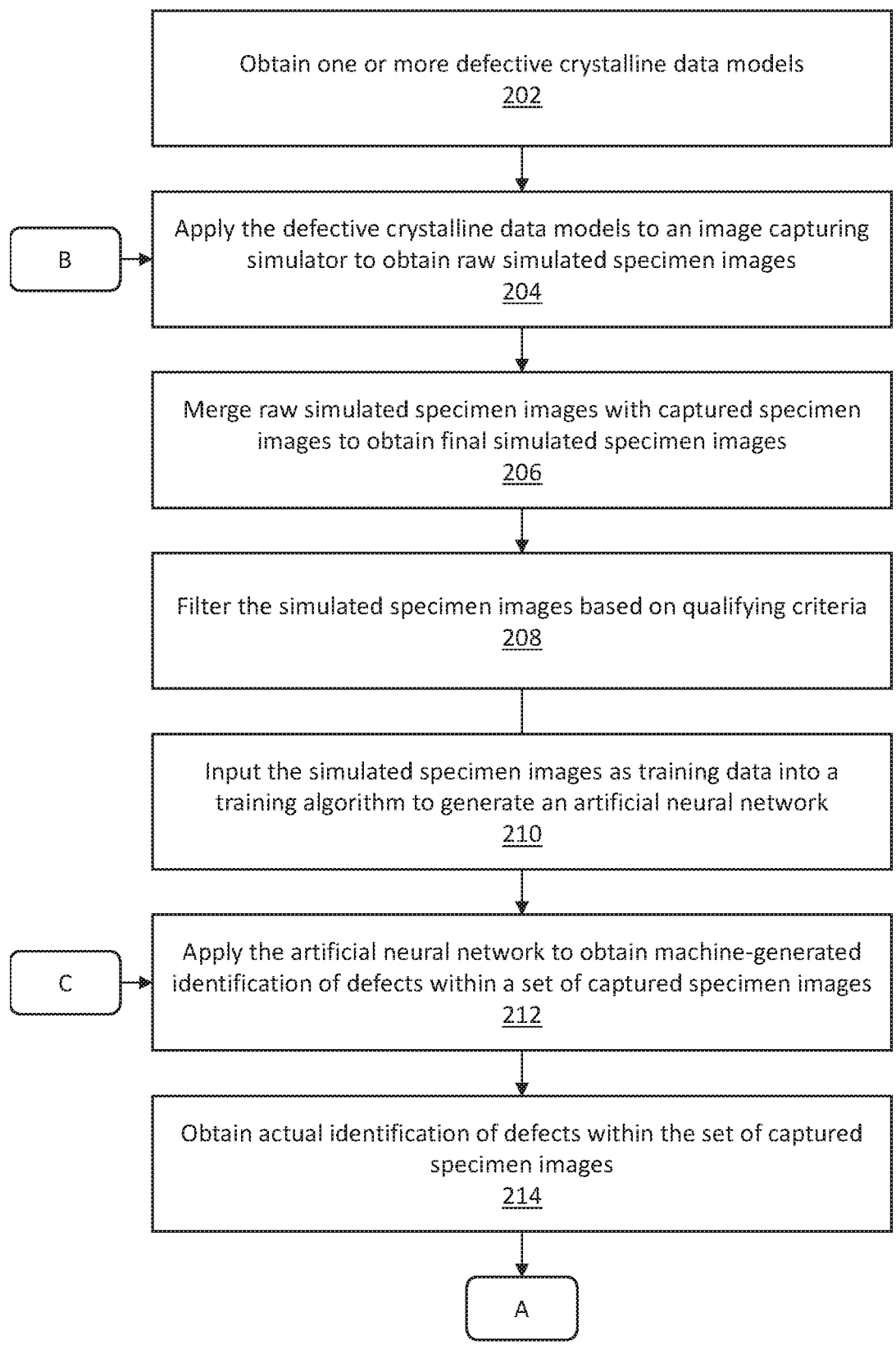
FIGS. 2A-B illustrate an example set of operations for training an artificial neural network using simulated specimen images, in accordance with one or more embodiments.
Figure 2B:
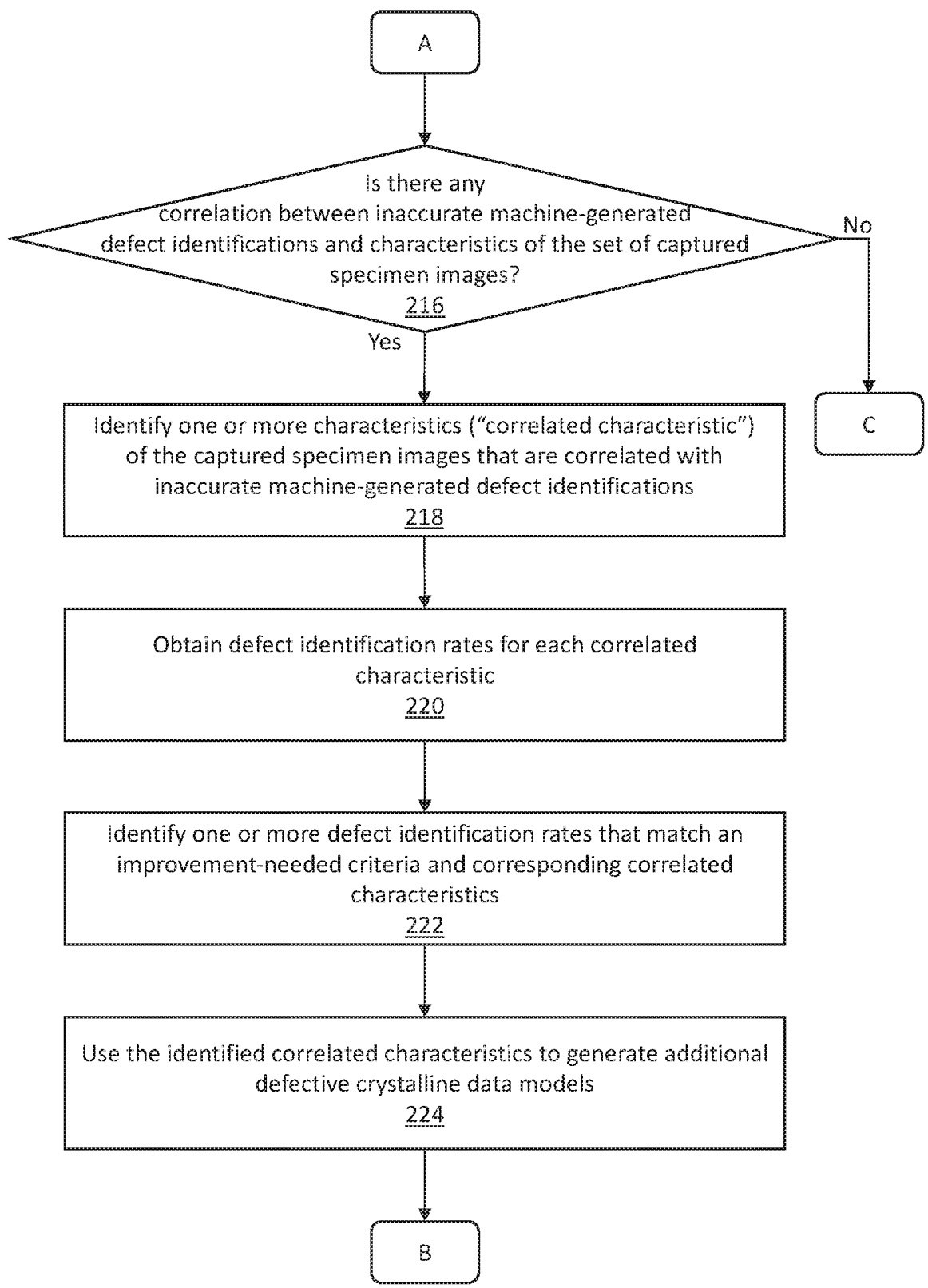

FIGS. 2A-B illustrate an example set of operations for adapting microscopy parameters of an adaptive specimen image acquisition system using an artificial neural network, in accordance with one or more embodiments. One or more operations illustrated in FIGS. 2A-B may be modified, rearranged, or omitted all together. Accordingly, the particular sequence of operations illustrated in FIGS. 2A-B should not be construed as limiting the scope of one or more embodiments.

One or more embodiments include obtaining one or more defective crystalline data models (Operation 202). One or more defective crystalline data models may be specified via user input. As an example, a set of defective crystalline data models may be entered by a user using a user interface.

Additionally or alternatively, one or more defective crystalline data models may be generated by modifying a previously-generated defective crystalline data model. As an example, a previously-generated defective crystalline data model may be associated with a particular crystalline material and particular defect types. Microscope characteristics and/or noise characteristics of the previously-generated defective crystalline data model may be modified to generate a series of defective crystalline data models. The series of defective crystalline data models may be associated with the same crystalline material and defect types.

As an example, a series of defective crystalline data models associated with different convergence angles may be generated. A convergence angle may be defined as a half opening angle, that is, an angle with respect to the optical axis of the microscope. Starting with a particular convergence angle associated with a particular defective crystalline data model, the convergence angle may be modified by an increment of 1 milliradian (mrad). One defective crystalline data model may be associated with a convergence angle of 4 mrad; another defective crystalline data model may be associated with a convergence angle of 5 mrad; another defective crystalline data model may be associated with a convergence angle of 6 mrad.

One or more embodiments include applying the defective crystalline data models to an image capturing simulator to obtain raw simulated specimen images (Operation 204). The defective crystalline data models are input into an image capturing simulator. As described above, an example of an image capturing simulator is EMsoft. Based on the defective crystalline data models, the image capturing simulator generates raw simulated specimen images.

One or more embodiments include merging raw simulated specimen images with captured specimen images to obtain final simulated specimen images (Operation 206). Captured specimen images that include noise characteristics and/or other characteristics to be incorporated into the training data for an ANN are identified. As an example, a user may desire that noise resulting from dust particles resting on a specimen be incorporated into the training data for an ANN. Captured specimen images showing dust particles may be identified.

The captured specimen images are merged with the raw simulated specimen images. Portions of the captured specimen images showing the desired noise characteristics and/or other characteristics are identified. Portions of the raw simulated specimen images showing the simulated defects are identified. The identified portions of the captured specimen images may replace portions of the raw simulated specimen images that do not show the simulated defects. The merged specimen image may be referred to as a "final simulated specimen image," or a "simulated specimen image." The same captured specimen image may be merged with multiple raw simulated specimen images. Each merger generates a different final simulated specimen image.

As an example, a captured specimen image may show a crystalline material including a dust particle. A series of raw simulated specimen images may show a crystalline material including a simulated defect of a particular defect type. The portion of the captured specimen image showing the dust particle may replace a respective portion of each raw simulated specimen image. Hence, a series of final simulated specimen images showing both the simulated defect and the dust particular may be generated.

One or more embodiments include filtering the simulated specimen images based on qualifying criteria (Operation 208). Qualifying criteria for simulated specimen images are obtained from a data repository. Qualifying criteria are used for determining whether a simulated specimen image qualifies as training data for an ANN. As an example, a qualifying criteria may require that simulated defects in a simulated specimen image be associated with a level of visibility that is above a threshold value. A level of visibility of a simulated defect may be determined based on a contrast level between the simulated defect and the surrounding areas of the simulated specimen image.

Each simulated specimen image is evaluated based on the qualifying criteria. If a simulated specimen image satisfies the qualifying criteria, then the simulated specimen image is used as training data. If a simulated specimen image does not satisfy the qualifying criteria, then the simulated specimen image is not used as training data.

One or more embodiments include inputting the simulated specimen images as training data into a training algorithm to generate an ANN (Operation 210). The simulated specimen images that satisfy the qualifying criteria are input into a training algorithm. Based on the simulated specimen images, the training algorithm determines weights associated with connections between artificial neurons within an ANN. Additionally or alternatively, the training algorithm determines other attributes of the ANN, such as the connections between the artificial neurons, the number of layers of artificial neurons, and/or the functionality of the artificial neurons.

One or more embodiments include applying the ANN to obtain machine-generated identification of defects within a set of captured specimen images (Operation 212). A set of captured specimen images are obtained. As an example, a set of captured specimen images may be obtained via user input. The captured specimen images may include real defects that a user would like to identify and/or analyze.

The ANN, generated at Operation 210, is applied to the set of captured specimen images. For each captured specimen image, the ANN determines whether there are any defects within the captured specimen image. If there are one or more defects in a captured specimen image, the ANN may determine a position of each defect, a defect type of each defect, and/or other attributes of each defect.

One or more embodiments include obtaining actual identification of defects within the set of captured specimen images (Operation 214). A user and/or another application may determine whether there are any actual defects shown in each captured specimen image. The user and/or application may determine a position of each defect, a defect type of each defect, and/or other attributes of each defect. As an example, a user may review each captured specimen image to identify any defects within the captured specimen image. As another example, a testing application may conduct tests on each specimen, which is shown in the captured specimen images, to determine whether the specimen includes any defects.

In an embodiment, new training data may be input into the training algorithm at any time to generate a modified ANN. Optionally, the captured specimen images, labeled with the actual identification of defects, may be fed back as training data into the training algorithm. Accordingly, the training algorithm may generate a modified ANN.

One or more embodiments include determining whether there is any correlation between inaccurate machine-generated defect identifications and characteristics of the set of captured specimen images (Operation 216). For each captured specimen image, the machine-generated defect identification, determined at Operation 212, and the actual defect identification, determined at Operation 214, are compared against each other.

If there is a match between a machine-generated defect identification for a particular captured specimen image and the actual defect identification for the particular captured specimen image, then the machine-generated defect identification for the particular captured specimen image is determined to be "accurate." If there is no match between a machine-generated defect identification for a particular captured specimen image and the actual defect identification for the particular captured specimen image, then the machine-generated defect identification for the particular captured specimen image is determined to be "inaccurate."

For each captured specimen image, a set of characteristics are determined. A set of characteristics for a particular captured specimen image may include any of the following:
(a) the defect types of the defects, within the particular captured specimen image, as determined by the ANN at Operation 212;
(b) the defect types of the defects, within the particular captured specimen image, as determined by a user and/or another application at Operation 214;
(c) the characteristics of the crystalline material that is shown in the particular captured specimen image;
(d) microscope characteristics associated with capturing the particular captured specimen image, such as a dwell time, or spot size, used for capturing the particular captured specimen image; and
(e) noise characteristics associated with capturing the particular captured specimen image, such as whether or not the particular captured specimen image shows any dust particles.

Whether there are any correlations between inaccurate machine-generated defect identifications and characteristics of the captured specimen images is determined. As an example, clustering may be used to determine whether any correlations between inaccurate machine-generated defect identifications and characteristics of the captured specimen images. Clustering algorithms include, for example, connectivity-based clustering, centroid-based clustering, distribution-based clustering, and density-based clustering.

If there is no correlation between inaccurate machine-generated defect identifications and characteristics of the set of captured specimen images, then the ANN may continue to be used without any modification. Operation 212 may be iterated by applying the ANN to additional captured specimen images.

If there is correlation between inaccurate machine-generated defect identifications and characteristics of the set of captured specimen images, then one or more embodiments include identifying one or more characteristics of the captured specimen images that are correlated with inaccurate machine-generated defect identifications (Operation 218). A characteristic of the captured specimen images that is correlated with inaccurate machine-generated defect identifications may be referred to herein as a "correlated characteristic."

As an example, a set of captured specimen images may be associated with the following defect identifications and characteristics:

|  | Accurate/Inaccurate Defect Identification | Defect Type | Noise Characteristic |
|---|---|---|---|
| Image 1 | Inaccurate | Defect Type A | Dust Particle |
| Image 2 | Inaccurate | Defect Type A | None |
| Image 3 | Inaccurate | Defect Type A | Dust Particle |
| Image 4 | Accurate | Defect Type B | Dust Particle |

In the above example, each of Image 1, Image 2, and Image 3 is associated with an inaccurate machine-generated defect identification and Defect Type A. Meanwhile, Image 1 and Image 3 are associated with a dust particle, while Image 2 is not associated with any noise characteristics. Hence, there may be a correlation between inaccurate defect identifications and Defect Type A. However, there is no correlation between inaccurate defect identifications and dust particles. Defect Type A may be referred to as a "correlated characteristic."

One or more embodiments include obtaining defect identification rates for each correlated characteristic (Operation 220). A particular subset of captured specimen images that is associated with a particular correlated characteristic is identified. The number of accurate machine-generated defect identifications associated with the particular subset of captured specimen images is determined. The number of accurate machine-generated defect identifications divided by the number of captured specimen images within the particular subset is determined as the "defect identification rate" for the particular correlated characteristic.

As an example, inaccurate defect identifications may be correlated with captured specimen images that show defects of Defect Type A. Defect Type A may be referred to as a correlated characteristic. A subset of captured specimen images that show defects of Defect Type A may include: Image 3, Image 5, Image 19, and Image 23. The defect identifications for the subset of captured specimen images may be as follows:

|  | Machine-Generated Defect Identification (By ANN) | Actual Defect Identification (By User) |
|---|---|---|
| Image 3 | Defect Type A | Defect Type A |
| Image 5 | Defect Type B | Defect Type A |
| Image 19 | Defect Type B | Defect Type A |
| Image 23 | Defect Type C | Defect Type A |

For Image 3, the machine-generated defect identification matches the actual defect identification, hence the machine-generated defect identification is determined as "accurate."

For each of Image 5, Image 19, and Image 23, the machine-generated defect identification does not match the actual defect identification, hence the machine-generated defect identification is determined as "inaccurate."

Hence, there is one accurate machine-generated defect identification. There is a total of four captured specimen images associated with the correlated characteristic of Defect Type A. Hence, the defect identification rate, for the correlated characteristic of Defect Type A, is ¼=25%.

As another example, inaccurate defect identifications may be correlated with captured specimen images that were captured using a convergence angle between 3 and 6 mrad. A convergence angle between 3 and 6 mrad may be referred to as a correlated characteristic. The convergence angles for captured specimen images may be as follows:

|  | Convergence Angle |
|---|---|
| Image 1 | 3 |
| Image 2 | 3 |
| Image 3 | 3 |
| Image 4 | 7 |
| Image 5 | 7 |
| Image 6 | 7 |
| Image 7 | 6 |
| Image 8 | 5 |

Hence, a subset of captured specimen images associated with the correlated characteristic may be Image 1, Image 2, Image 3, Image 7 and Image 8.

The machine-generated defect identifications for Image 1, Image 2, and Image 3, may be accurate. The machine-generated defect identifications for Image 7, and Image 8, may be inaccurate. Hence, the defect identification rate, for the correlated characteristic, is ⅗=60%.

One or more embodiments include identifying one or more defect identification rates that match an improvement-needed criteria and corresponding correlated characteristics (Operation 222). Improvement-needed criteria for defect identification rates are obtained from a data repository. Improvement-needed criteria are used for determining areas in which the ANN may be improved. In particular, the ANN's identification of defects shown in certain captured specimen images needs improvement. The certain captured specimen images are those images associated with a correlated characteristic that corresponds to a defect identification rate not matching an improvement-needed criteria.

Each defect identification rate, corresponding to a respective correlated characteristic, is evaluated based on the improvement-needed criteria. If a defect identification rate matches an improvement-needed criteria, then the correlated characteristic corresponding to the defect identification rate is identified. Additional defective crystalline data models associated with the identified correlated characteristic are generated, as further described below with reference to Operation 224. If a defect identification rate does not match an improvement-needed criteria, then the correlated characteristic corresponding to the defect identification rate is not identified.

As an example, an improvement-needed criteria may indicate a threshold value. Defect identification rates below the threshold value match the improvement-needed criteria. Correlated characteristics corresponding to the defect identification rates below the threshold value are identified.

As another example, the defect identification rates, for the correlated characteristics, may be sorted and ranked. A particular number of lowest defect identification rates may be determined as matching an improvement-needed criteria. Correlated characteristics corresponding to the lowest defect identification rates are identified.

One or more embodiments include using the identified correlated characteristics to generate additional defective crystalline data models (Operation 224). A previously-generated defective crystalline data model is identified. The previously-generated defective crystalline data model is modified using the correlated characteristics identified at Operation 222 to generate a new defective crystalline data model associated with the identified correlated characteristics. The new defective crystalline data model associated with the identified correlated characteristics may further be modified to generate additional defective crystalline data models associated with the identified correlated characteristics.

As an example, a previously-generated defective crystalline data model is associated with the following characteristics: Defect Type A; x-y coordinates of defect position (4, 6); beam current 10 pA; convergence angle 4 mrad. Defect Type B may be a correlated characteristic corresponding to a defect identification rate matching an improvement-needed criteria.

The previously-generated defective crystalline data model may be modified, such that Defect Type A is replaced with Defect Type B. Hence, the new defective crystalline data model may be associated with the following characteristics: Defect Type B; x-y coordinates of defect position (4, 6); beam current 10 pA; convergence angle 4 mrad.

Additional defective crystalline data models may be generated by modifying the new defective crystalline data model. The new defective crystalline data model may be modified by adjusting the beam current by increments of 0.1 pA. Hence, one defective crystalline data model may be associated with the following characteristics: Defect Type B; x-y coordinates of defect position (4, 6); beam current 10.1 pA; convergence angle 4 mrad. Another defective crystalline data model may be associated with the following characteristics: Defect Type B; x-y coordinates of defect position (4, 6); beam current 10.2 pA; convergence angle 4 mrad.

As another example, a previously-generated defective crystalline data model is associated with the following characteristics: Defect Type A; x-y coordinates of defect position (4, 6); beam current 10 pA. Defect Type B may be a correlated characteristic corresponding to a defect identification rate matching an improvement-needed criteria.

The previously-generated defective crystalline data model may be modified, such that Defect Type B is added to the previously-generated defective crystalline data model. A new simulated defect of Defect Type B may be added to the previously-generated defective crystalline data model. A new defect position may be determined for the simulated defect of Defect Type B. Hence, the new defective crystalline data model may be associated with the following characteristics: Defect Type A; x-y coordinates of defect position (4, 6); Defect Type B; x-y coordinates of defect position (5, 7); beam current 10 pA.

After generating the additional defective crystalline data models, Operations 204-210 may be iterated by applying the additional defective crystalline data models to an image capturing simulator, generating new simulated specimen images, and inputting the new simulated specimen images as training data into the training algorithm. Hence, the training data may include: the previously-used simulated specimen images, and the new simulated specimen images. Optionally, the training data may include: the captured specimen images previously analyzed at Operation 212, labeled with the actual identifications of defects previously obtained at Operation 214. Based on the new training data, the training algorithm generates a modified ANN.

Hence, the additional training data for the ANN includes simulated specimen images associated with characteristics for which the previous ANN performed poorly. Based on the additional training data, the ANN is further trained for the specific characteristics previously associated with poor performance.

In other embodiments, Operations 214-222 are performed. However, both defective crystalline data models associated with the identified correlated characteristics (the correlated characteristics associated with defect identification rates matching the improvement-needed criteria) and defective crystalline data models not associated with the identified correlated characteristics are generated. But the system focuses on the identified correlated characteristics by generating a larger number of defective crystalline data models associated with the identified correlated characteristics than defective crystalline data models not associated with the identified correlated characteristics. Hence, training data for generating a modified ANN includes both simulated specimen images associated with lower defect identification rates and simulated specimen images associated with higher defect identification rates.

In other embodiments, Operations 214-224 are not necessarily performed. Additional defective crystalline data models may be generated regardless of defect identification rates. Hence, both simulated specimen images associated with lower defect identification rates and simulated specimen images associated with higher defect identification rates are generated and input as training data into a training algorithm to generate a modified ANN.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
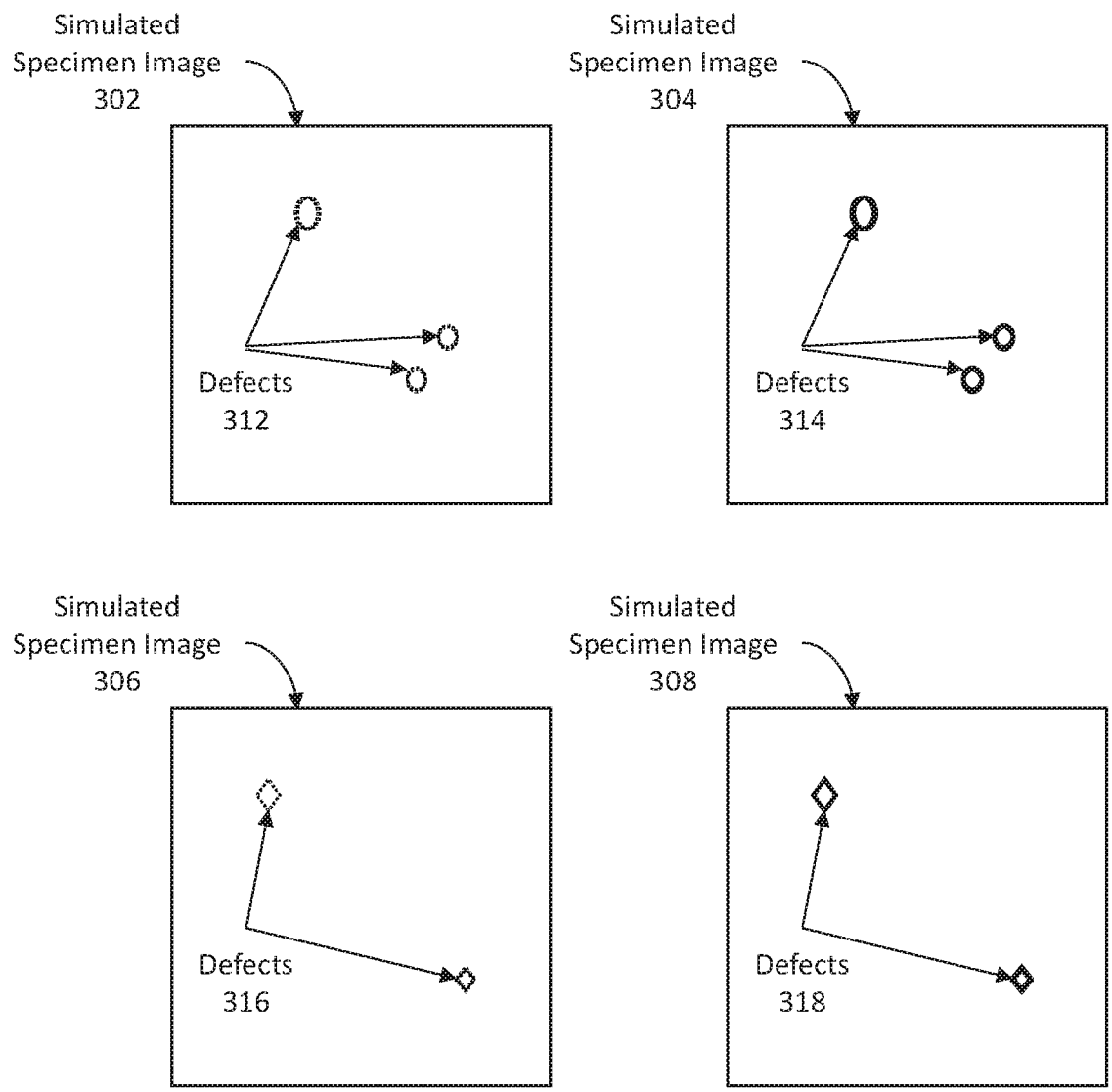
FIG. 3 illustrates examples of simulated specimen images for training an artificial neural network, in accordance with one or more embodiments.

FIG. 3 illustrates examples of simulated specimen images for training an artificial neural network, in accordance with one or more embodiments.

Defective Crystalline Data Model A includes the following characteristics: Defect Type A; x-y coordinates of defect positions (4, 9), (8, 4), (7, 3); beam current 9.5 pA.

Based on Defective Crystalline Data Model A, simulated specimen image 302 is generated. As shown, simulated specimen image 302 shows defects 312 of Defect Type A.

Defective Crystalline Data Model A is modified to generate Defective Crystalline Data Model B. In particular, the beam current is modified. Defective Crystalline Data Model B includes the following characteristics: Defect Type A; x-y coordinates of defect positions (4, 9), (8, 4), (7, 3); beam current 10.5 pA.

Based on Defective Crystalline Data Model B, simulated specimen image 304 is generated. As shown, simulated specimen image 304 shows defects 314 of Defect Type A. Defects 314 of simulated specimen image 304 are in the same positions as defects 312 of simulated specimen image 302. However, defects 314 of simulated specimen image 304 appear slightly differently from defects 312 of simulated specimen image 302 due to the modified beam current.

Additionally, Defective Crystalline Data Model C includes the following characteristics: Defect Type B; x-y coordinates of defect positions (3, 9), (9, 2); beam current 9.5 pA.

Based on Defective Crystalline Data Model C, simulated specimen image 306 is generated. As shown, simulated specimen image 306 shows defects 316 of Defect Type B. Defects 316 of simulated specimen image 306 appear differently from defects 312 and defects 314, since defects 316 are of Defect Type B, whereas defects 312 and defects 314 are of Defect Type A.

Defective Crystalline Data Model C is modified to generate Defective Crystalline Data Model D. In particular, the beam current is modified. Defective Crystalline Data Model D includes the following characteristics: Defect Type B; x-y coordinates of defect positions (3, 9), (9, 2); beam current 10.5 pA.

Based on Defective Crystalline Data Model D, simulated specimen image 308 is generated. As shown, simulated specimen image 308 shows defects 318 of Defect Type B. Defects 318 of simulated specimen image 308 are in the same positions as defects 316 of simulated specimen image 306. However, defects 318 of simulated specimen image 308 appear slightly differently from defects 316 of simulated specimen image 306 due to the modified beam current.

Simulated specimen images 302-308 are generated based on the defective crystalline data models, without using any image data, and without using any microscopes to capture specimen images of a real specimen. The simulated specimen images 302-308 are input as training data into a training algorithm. The training algorithm generates an ANN configured to identify defects in crystalline materials as shown in captured specimen images.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
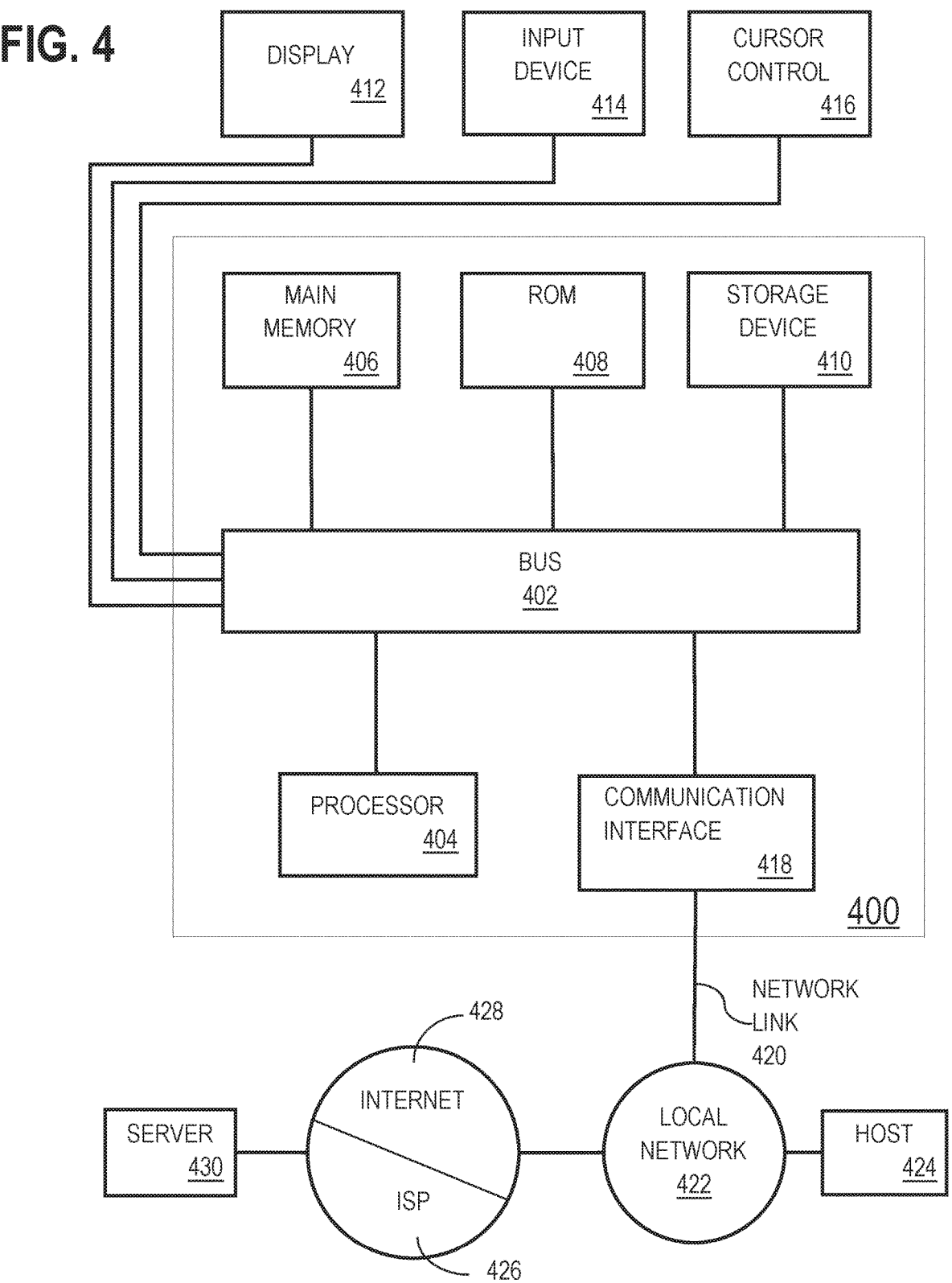
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware devices, cause performance of operations comprising:
    obtaining a first data model comprising a description of (a) one or more characteristics of a crystalline material, and (b) one or more characteristics of a first defect type of a structural defect within the crystalline material, wherein the first data model does not include any image data;
    applying the first data model to a simulation model to generate a first simulated specimen image which shows the crystalline material including a first set of one or more defects of the first defect type;
    inputting a set of one or more simulated specimen images as training data into a training algorithm to generate an artificial neural network, the set of simulated specimen images including the first simulated specimen image; and
    generating the artificial neural network, wherein the artificial neural network is configured to detect a second set of one or more defects of the first defect type in the crystalline material as shown in a set of one or more scanned specimen images,
    wherein the instructions further cause the performance of:
        receiving an input identifying a modification of the first data model;
        modifying the first data model based on the input to generate a second data model;
        applying the second data model to the simulation model to generate a second simulated specimen image;
        inputting at least the second simulated specimen image as training data into the training algorithm to generate a modified artificial neural network; and
        generating the modified artificial neural network.

2. The medium of claim 1, wherein the first data model does not comprise data that can be rasterized as a grid of pixels.

3. The medium of claim 1, wherein the instructions further cause the performance of obtaining the first data model.

4. The medium of claim 3, wherein obtaining the first data model comprises receiving one or more user inputs that identify at least one of the characteristics of the crystalline material, and the characteristics of the first defect type.

5. The medium of claim 1, wherein applying the first data model to the simulation model comprises applying the first data model to an image capturing simulator to obtain a raw simulated specimen image.

6. The medium of claim 1, wherein the modification corresponds to a change of one or more of:
    the characteristics of the crystalline material;
    the characteristics of the first defect type;
    microscope characteristics; and
    noise characteristics.

7. The medium of claim 1, wherein the modified artificial neural network is configured to identify a second defect type in the crystalline material as shown in the set of one or more scanned specimen images.

8. The medium of claim 1, wherein the artificial neural network is configured to identify the first defect type in the crystalline material as shown in the set of one or more scanned specimen images obtained with a first charged particle microscope system having a first set of microscope characteristics, and wherein the modified artificial neural network is configured to identify the first defect type in the crystalline material as shown in a different set of one or more scanned specimen images obtained with a second charged particle microscope system having a second set of microscope characteristics.

9. The medium of claim 1, wherein the first simulated specimen image is a raw simulated specimen image, and the instructions further cause the performance of merging the raw simulated specimen image into an acquired image to generate a final simulated specimen image, wherein the acquired image was obtained with a charged particle microscope system.

10. The medium of claim 9, wherein the set of simulated specimen images including the first simulated specimen image further includes the final simulated specimen image.

11. The medium of claim 9, wherein the first data model further comprises one or more microscopy parameters of a first microscope, the microscopy parameters comprising at least one of:
   a dwell time;
   a resolution;
   an accelerating voltage;
   a beam current;
   a convergence angle; and
   a spot size.

12. The medium of claim 1, wherein the operations further comprise:
   determining a defect identification rate for the first defect type,
   wherein obtaining the first data model and applying the first data model to the simulation model are performed responsive to determining that the defect identification rate for the first defect type is lower than a threshold.

13. The medium of claim 1, wherein the first data model comprises a non-image data file.

14. The medium of claim 1, wherein the instructions further cause the performance of:
   identifying one or more defect identification rates for the artificial neural network that match an improvement needed criteria;
   identifying one or more correlated characteristics corresponding to the one or more defect identification rates; and
   generating, based on the one or more correlated characteristics, a second simulated specimen image using the simulation model; and
   generating a modified artificial neural network using the second simulated specimen image, wherein the modified artificial neural network is configured to have improved defect identification rates for the improvement needed criteria.

15. The medium of claim 14, wherein generating the second simulated specimen image comprises:
   generating a second data model based on the one or more correlated characteristics, wherein the second data model comprises at least one of (a) a modified characteristic of the crystalline material, and (b) a modified characteristic of the first defect type; and
   applying the second data model to the simulation model to generate the second simulated specimen image.

16. A method, comprising:
   obtaining a first data model comprising a description of (a) one or more characteristics of a crystalline material, and (b) one or more characteristics of a first defect type of a structural defect within the crystalline material, wherein the first data model does not include any image data;
   applying the first data model to a simulation model to generate a first simulated specimen image which shows the crystalline material including a first set of one or more defects of the first defect type;
   inputting a set of one or more simulated specimen images as training data into a training algorithm to generate an artificial neural network, the set of simulated specimen images including the first simulated specimen image;
   generating the artificial neural network, wherein the artificial neural network is configured to detect a second set of one or more defects of the first defect type in the crystalline material as shown in a set of one or more scanned specimen images;
   identifying one or more defect identification rates for the artificial neural network that match an improvement needed criteria;
   identifying one or more correlated characteristics corresponding to the one or more defect identification rates of the artificial neural network;
   generating, based on the one or more correlated characteristics, a second simulated specimen image using the simulation model; and
   generating a modified artificial neural network using the second simulated specimen image,
   wherein the modified artificial neural network is configured to have improved defect identification rates for the improvement needed criteria, and
   wherein the method is performed using at least one device including a hardware processor.

17. The method of claim 16, wherein generating the second simulated specimen image comprises:
   generating a second data model based on the one or more correlated characteristics, wherein the second data model comprises at least one of (a) a modified characteristic of the crystalline material, and (b) a modified characteristic of the first defect type; and
   applying the second data model to the simulation model to generate the second simulated specimen image.

18. A system comprising at least one device including a hardware processor, wherein the system is configured to perform operations comprising:
   obtaining a first data model comprising a description of (a) one or more characteristics of a crystalline material, and (b) one or more characteristics of a first defect type of a structural defect within the crystalline material, wherein the first data model does not include any image data;
   applying the first data model to a simulation model to generate a first simulated specimen image which shows the crystalline material including a first set of one or more defects of the first defect type;
   inputting a set of one or more simulated specimen images as training data into a training algorithm to generate an artificial neural network, the set of simulated specimen images including the first simulated specimen image;
   generating the artificial neural network, wherein the artificial neural network is configured to detect a second set of one or more defects of the first defect type in the crystalline material as shown in a set of one or more scanned specimen images;
   identifying one or more defect identification rates for the artificial neural network that match an improvement needed criteria;
   identifying one or more correlated characteristics corresponding to the one or more defect identification rates of the artificial neural network;
   generating, based on the one or more correlated characteristics, a second simulated specimen image using the simulation model; and generating a modified artificial neural network using the second simulated specimen image,
wherein the modified artificial neural network is configured to have improved defect identification rates for the improvement needed criteria.

* * * * *

UNITED STATES PATENT AND TRADEMARK OFFICE
CERTIFICATE OF CORRECTION

PATENT NO. : 12,002,194 B2
APPLICATION NO. : 17/072035
DATED : June 4, 2024
INVENTOR(S) : Ondřej Machek et al.

It is certified that error appears in the above-identified patent and that said Letters Patent is hereby corrected as shown below:

In the Claims

In Column 21, Claim 11, Line 14, delete "claim 9," and insert -- claim 1, --, therefor.

Signed and Sealed this
Thirteenth Day of August, 2024

Katherine Kelly Vidal
*Director of the United States Patent and Trademark Office*